Jan. 11, 1938.  E. HÜTTEMANN ET AL  2,105,324
METHOD OF PRODUCING LIGHTWEIGHT MATERIAL
Filed April 28, 1934
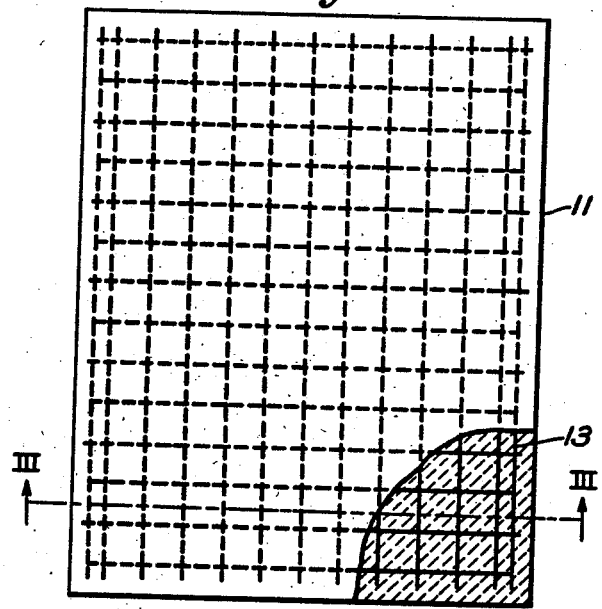
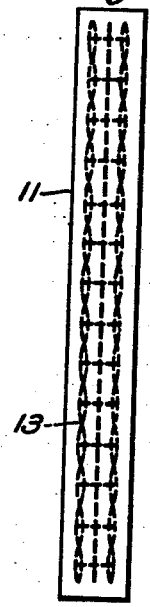
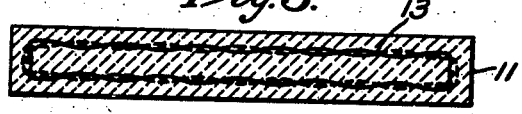
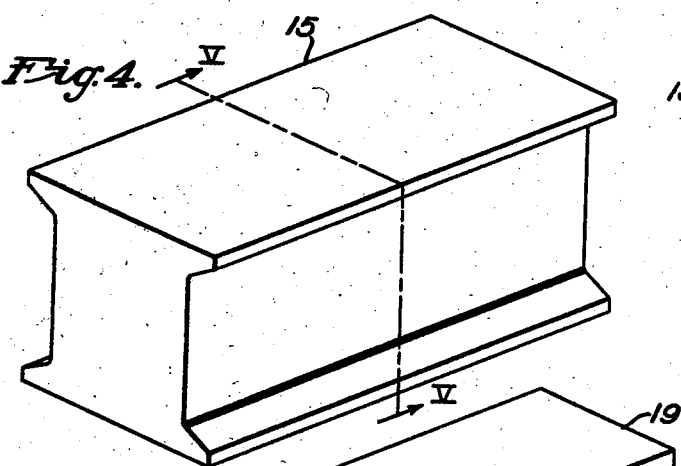
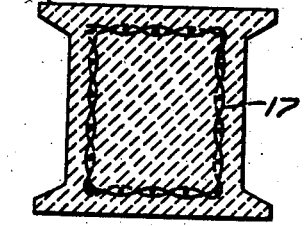
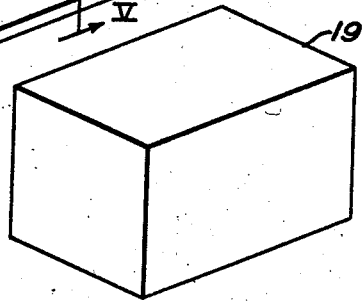
INVENTORS
Erik Hüttemann and
Wolfgang Czernin.
BY
ATTORNEY Patented Jan. 11, 1938

2,105,324

UNITED STATES PATENT OFFICE 2,105,324

METHOD OF PRODUCING LIGHTWEIGHT MATERIAL

Erik Hüttemann, Berlin-Wilmersdorf, and Wolfgang Czernin, Berlin-Friedenau, Germany, assignors to Frederick O. Anderegg, Forest Hills Boro, Pa.

Application April 28, 1934, Serial No. 722,884 In Germany August 16, 1933

8 Claims. (Cl. 18—48)

Our invention relates to light weight slabs, plates, blocks, or columns, or to granular material having a wide variety of uses.

An object of our invention is to provide an artificially microporous building block having a very fine and uniform texture.

Another object of our invention is to provide a heat-insulating brick, block, plate, slab or column that shall combine high heat-insulating characteristics with light weight and with relatively great strength.

Another object of our invention is to provide a light weight heat-insulating building block that shall have relatively high sound-absorbing capacity, particularly in those blocks having a very light unit weight.

Another object of our invention is to provide a block or slab that shall be able to withstand subjection to relatively high temperatures, even to the extent of being non-inflammable and fireproof and that shall, at the same time, transmit relatively little heat therethrough.

Still another object of our invention is to provide a building block, plate or column having a relatively small unit weight and a heat-insulating characteristic, that shall be provided with a metal reinforcement.

Other objects of our invention will either be apparent from a description of the product, its novel characteristics, and of some of its uses, or will be specifically pointed out hereinafter.

In order to obtain the product embodying our invention, we pulverize a siliceous material or its equivalent, to a powdery condition, and also reduce calcium oxide or hydroxide or their equivalent to a finely divided condition, mix these highly comminuted materials in certain proportions relatively to each other with water to form a slurry, partially preharden the mixture by subjection to a selected external condition, form the material to desired shapes by any one of a number of different methods, and then indurate the shapes by subjecting them to the action of steam in a closed container, then cool and dry the shapes.

The materials which we have been able to use may be classified generally into basic reacting materials, of which hydrated lime is representative, and acid reacting materials, such as those containing silica. In both cases the materials may be used by us in substantially their raw condition, or some of the silicates, especially the aluminum silicates, may advantageously be calcined at a temperature slightly above their disintegration temperature.

Among the basic reacting materials which we may use, either singly or in selected combinations, may be mentioned the following: oxides or hydroxides of the earth alkalies, such as calcium, barium, strontium, or of magnesium, quick lime, dry or set slacked lime, hydraulic lime, natural cement, Portland cement, roman cement, etc.

Among the acid reacting materials which we may use either singly or in selected suitable combinations, are the following: silicic acid, alumina, oxide of iron, Moler, bauxite, quartz, blast furnace slags, pumice and pozzuolonic materials, iron ore, clay, trass, shale, marl, granite, sea slime, etc.

We may add to these materials a light weight aggregate, such as cinders, puffed slate, bloated or burned clay or shale, popcorn-slag, dry granulated slag or the like, in proportions varying from 10% of the total to more than the amount of the combined siliceous and calcareous, or acid and basic reacting materials.

One of the uses to which our new product may be put is for use as walls, both inside and outside, floors, ceilings, partitions, beams and columns in buildings. The larger units are preferably provided with a metal reinforcement. Our material may also be used as a filler for masses of concrete, and an important characteristic of material used in such application is that it shall be heat-insulating, that it shall be relatively strong and yet of light weight, that it shall be capable of being made waterproof and also of being painted, characteristics possessed to a high degree by our product.

When it is desired to make light weight heat-insulating building blocks or plates, we may use any one of the above mentioned siliceous materials and any one of the calcareous materials listed hereinbefore, either grinding them separately or in proper combination, until 90% or more will pass through a 200 mesh screen. As an example of the proportions of these raw materials, we may use from 15 to 55 parts by weight of calcareous material and from 85 to 45 parts of siliceous material. The grinding may be done either wet or dry, but the mixture of the powdered materials will have added thereto an amount of water, usually in excess of the amount of the powdered solid materials.

The siliceous and calcareous materials, mixed as above, and with or without the light weight aggregate, are thoroughly stirred to obtain a uniformly homogeneous mixture, the particles of which will be held in suspension in the water until completely hydrated, the mixture being then allowed to thicken to a certain degree as by letting it stand, by stirring it, or by heating it by steam in a closed container. The light weight aggregate may be added either before or after this thickening operation.

When it is desired to make members or shapes having a very small unit weight, it is very important that the silicates, aluminates, or ferrites, be ground exceedingly fine in order to speed up the reaction between them and the calcareous material and to obtain, within a relatively short time, a slurry thick enough to pour satisfactorily into an ordinary mold.

After this slurry has been hardened sufficiently to permit of its being formed or shaped, it is cast, extruded, pressed or otherwise shaped to the desired form and the pressure method may be used, particularly for the members or shapes having the higher specific gravity. The shaped forms are then indurated in an autoclave under steam pressure until properly hardened. After the shapes are cooled and dried they are ready for use.

This induration is an essential step in the method of making the blocks or other shapes and the results thereof may be expressed by saying that it provides an artificially microporous material having a three-dimensional solid skeleton of calcium hydrosilicate, hydroaluminate, or hydroferrite, with microscopic voids or openings therein which are uniformly distributed, the number of the voids or pores increasing with the proportion of water used in the process of manufacture and decreasing with the pressure used in forming the shapes. Numerous observations and chemical, physical and microscopic tests on the various forms of our product have shown that the number and especially the size of the pores vary in the manner set forth, which pores may thus be said to honeycomb the material or member and to provide an effective adsorption area many times greater than the surface area of the member, or an efficient heat-insulating structure.

In a modification of our process we may proceed as follows: instead of taking the full amount of the calcareous binder, as hereinbefore set forth, we mix the silica initially with only one half or two thirds of the total amount of calcareous material and with the desired amount of water. This mixture is then allowed to preharden while being stirred until its thixotropic property has almost disappeared. We then disintegrate the mass by any suitable device to a granular condition. The rest of the lime is thoroughly hydrated by subjection to steam at a pressure on the order of 90 to 100 pounds for about two hours or by an equivalent treatment, and is then thoroughly mixed with the prehardened mixture and is then formed into desired shapes by pressing or extrusion, then indurated by subjection to steam in an autoclave and is then dried. The method gives very good results and we have found that this product will receive and retain sharp corners and edges.

The use of diatomaceous earth in a light weight heat-insulating material is well known, and we wish to point out here wherein our product differs in an important essential from that obtained by the use of unground diatomaceous earth. The skeleton of a shape, such as a block or brick, made of raw diatomaceous earth is "hollow", since the inherent or natural characteristic of the diatomaceous earth has not been changed or destroyed. Our product is made of raw materials that have been ground so fine as to be in a powdery condition and the original or natural porous structure has been destroyed, so that its skeleton is substantially "solid" and is constituted by the completely combined reaction products of the raw materials used in its manufacture.

Referring to the drawing,

Figure 1 is a view, in front elevation, of a slab or plate embodying our invention, a part thereof being shown broken away.

Fig. 2 is a view, in side elevation thereof,

Fig. 3 is a view, in section through the plate shown in Fig. 1 and taken on the line III—III thereof, Fig. 4 is a view, in perspective, of a reinforced beam or column embodying our invention, Fig. 5 is a view, in lateral section therethrough, taken on the line V—V of Fig. 4, Fig. 6 is a view, in perspective, of a small brick or block embodying our invention.

Referring initially to Figs. 1 to 3 inclusive, we have there illustrated a light weight heat-insulating slab or plate 11, which is shown as substantially rectangular in outline. The dimensions of such slabs or plates may vary widely, and for illustrative purposes we may mention that plates or slabs of this kind may be on the order of three feet to five feet wide, up to twelve feet or more long, and from three to six or more inches thick. It is provided with an expanded metal reinforcing member 13 of substantially boxlike shape, which reinforcing member may be of interwoven wires or rods, expanded metal lath, welded mesh or chicken wire mesh, the metal being preferably galvanized, or made of, or plated with, a corrosion-resistant metal wherever opportunity for moisture to come in contact with the unit is likely to occur. It has been found advisable to coat the reinforcement, when not protected by corrosion-resistant metal, with neat cement slurry sufficiently long before use to permit the cement to harden.

Fig. 4 of the drawing shows an extruded reinforced beam or column 15, of substantially heavy I-shape in section and including a metal reinforcing member 17 of open boxlike shape. The metal reinforcement, see Fig. 5, holds the whole block together during the indurating period, as well as during the cooling and the drying period. It also aids in directing, to a very helpful extent, the direction in which shrinkage occurs, making it occur mainly normal to the plane of the reinforcement.

Fig. 6 shows, in perspective, a simple block or brick 19, which is not provided with a metal reinforcing member therein, the length of the block being less than about 16 inches. We have found it advisable to reinforce all units embodying our invention whose main dimension is on the order of 16 to 20 inches or more, where it can be expected that the unit will be subjected to relatively heavy loads.

The product embodying our invention, and particularly when made in the form of large plates or slabs to be subjected to the weather can be waterproofed by any suitable and known means, such as by impregnating the surface or by using an oil paint thereon. The surface will also take a fair polish and can be painted.

The multi-layer units, shown in Figs. 7 and 8 are especially valuable where a combination of strength and heat insulation is required.

One method by which units of this general kind can be manufactured is that disclosed and claimed in our U. S. Patent No. 1,932,971, issued October 31, 1933. We do not however, desire to be limited to this particular process in the production of our new material, as other methods effective for the same purpose may be used. We desire therefore that the scope of our invention shall be limited only by the prior art or as set forth in the appended claims.

We claim as our invention:

1. The method of producing light weight artificial material, which comprises intimately intermixing with water pulverized calcium oxide or hydroxide and siliceous materials in proportion varying from about equal parts by weight of the calcareous and siliceous materials to about one part of calcareous material to about three parts of siliceous material, the proportion of water by weight exceeding the weight of the calcareous and siliceous materials, subjecting the same to an elevated temperature to form a thixotropic mass, thereafter intermixing with the stated resulting thixotropic mass light weight aggregate in a proportion by weight less than the stated weight of the calcareous and siliceous materials, and subjecting such resulting intermixture to elevated temperature under steam pressure, thereby deriving a light weight artificial material of three-dimensional skeleton of solid calcium hydro-silicate reinforced by the stated aggregate, the stated derived artificial material having substantially uniformly distributed pores.

2. The method of producing light weight artificial material, which comprises intimately intermixing with water pulverized calcium oxide or hydroxide and siliceous materials in proportion varying from about equal parts by weight of the calcareous and siliceous materials to about one part of calcareous material to about three parts of siliceous material, the proportion of water by weight exceeding the weight of the calcareous and siliceous materials, subjecting the same to an elevated temperature to form a thixotropic mass, thereafter intermixing with the stated resulting thixotropic mass light weight aggregate in a proportion by weight of the order of ten per cent. of the stated weight of the calcareous and siliceous materials, and subjecting such resulting intermixture to elevated temperature under steam pressure, thereby deriving a light weight artificial material of three-dimensional skeleton of solid calcium hydro-silicate reinforced by the stated aggregate, the stated derived artificial material having substantially uniformly distributed pores.

3. The method of producing light weight artificial material, which comprises intimately intermixing with water pulverized calcium oxide or hydroxide and siliceous materials in proportion varying from about equal parts by weight of the calcareous and siliceous materials to about one part of calcareous material to about three parts of siliceous material, the proportion of water by weight exceeding the weight of the calcareous and siliceous materials, subjecting the same to an elevated temperature to form a thixotropic mass, thereafter intermixing with the stated resulting thixotropic mass light weight aggregate consisting substantially of preformed artificial material of porous calcium hydro-silicate in a proportion by weight less than the stated weight of the calcareous and siliceous materials, and subjecting such resulting intermixture to elevated temperature under steam pressure, thereby deriving a light weight artificial material of three-dimensional skeleton of solid calcium hydro-silicate reinforced by the stated aggregate, the stated derived artificial material having substantially uniformly distributed pores.

4. The method of producing light weight artificial material, which comprises intimately intermixing with water pulverized calcium oxide or hydroxide and siliceous materials in proportion varying from about equal parts by weight of the calcareous and siliceous materials to about one part of calcareous material to about three parts of siliceous material, the proportion of water by weight exceeding the weight of the calcareous and siliceous materials, subjecting the same to an elevated temperature to form a thixotropic mass, thereafter intermixing with the stated resulting thixotropic mass light weight aggregate consisting substantially of pre-formed artificial material of porous calcium hydro-silicate in a proportion by weight of the order of ten per cent. of the stated weight of the calcareous and siliceous materials, and subjecting such resulting intermixture to elevated temperature under steam pressure, thereby deriving a light weight artificial material of three-dimensional skeleton of solid calcium hydro-silicate reinforced by the stated aggregate, the stated derived artificial material having substantially uniformly distributed pores.

5. The method of producing light weight artificial material, which comprises intimately intermixing with water pulverized calcium oxide or hydroxide and siliceous materials in proportion varying from about equal parts by weight of the calcareous and siliceous materials to about one part of calcareous material to about three parts of siliceous material, the proportion of water by weight exceeding the weight of the calcareous and siliceous materials, subjecting the same to an elevated temperature to form a thixotropic mass, thereafter pouring the stated thixotropic mass about wire mesh and subjecting the same to elevated temperature under steam pressure, thereby deriving a light weight artificial material of three-dimensional skeleton of solid calcium hydro-silicate reinforced by the stated wire mesh, the stated derived artificial material having substantially uniformly distributed pores.

6. An artificial light weight material comprising an indurated mixture of pulverized calcium oxide or hydroxide and siliceous materials in a proportion varying from about equal parts by weight to about one part of calcareous to about one and one-half parts of siliceous material and light weight aggregate in proportion by weight less than the stated weight of the calcareous and siliceous materials, the mass being substantially of three-dimensional skeleton of solid calcium hydro-silicate reinforced by the stated aggregate.

7. An artificial light weight material comprising an indurated mixture of pulverized calcium oxide or hydroxide and siliceous materials in a proportion varying from about equal parts by weight to about one part of calcareous to about one and one-half parts of siliceous material and light weight aggregate in proportion by weight of the order of ten per cent. of the stated weight of the calcareous and siliceous materials, the mass being substantially of three-dimensional skeleton of solid calcium hydro-silicate reinforced by the stated aggregate.

8. An artificial light weight material comprising an indurated mixture of pulverized calcium oxide or hydroxide and siliceous materials in a proportion varying from about equal parts by weight to about one part of calcareous to about one and one-half parts of siliceous material and light weight aggregate in proportion by weight less than the stated weight of the calcareous and siliceous materials, said mass being of three-dimensional skeleton of solid calcium hydro-silicate and wire mesh distributed within said mass.

ERIK HÜTTEMANN.
WOLFGANG CZERNIN.